March 7, 1944.  J. W. PODESTA  2,343,420
BROACHING MACHINE
Filed Aug. 2, 1940  7 Sheets-Sheet 2

INVENTOR.
John W. Podesta,
BY his Atty.

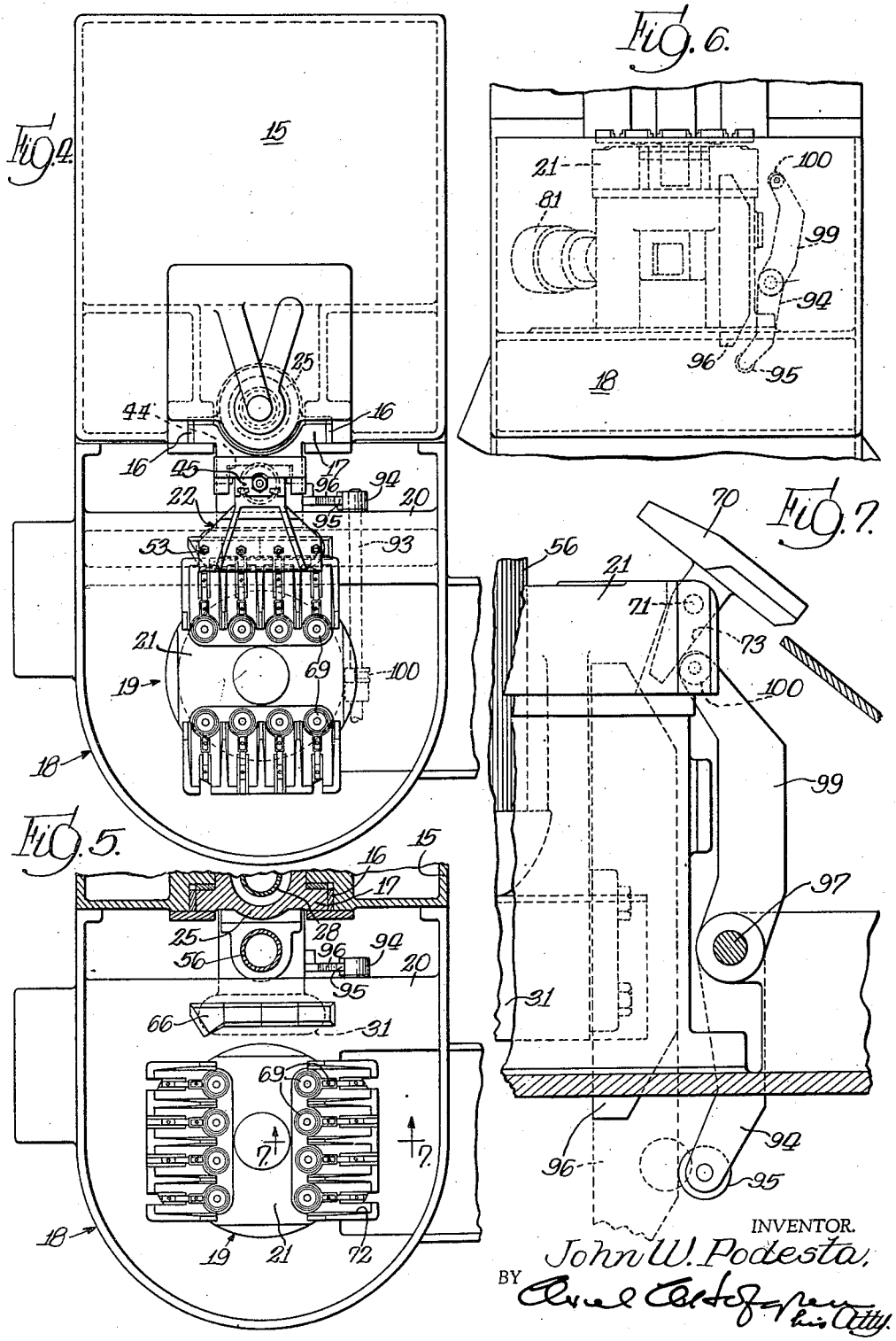

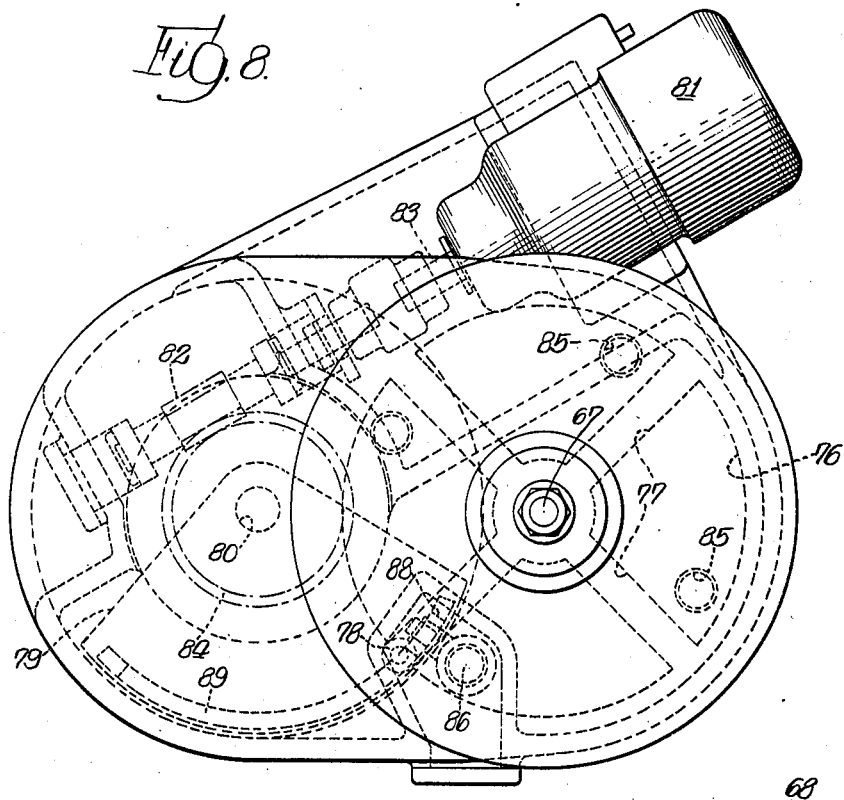
March 7, 1944.    J. W. PODESTA    2,343,420
BROACHING MACHINE
Filed Aug. 2, 1940    7 Sheets-Sheet 4

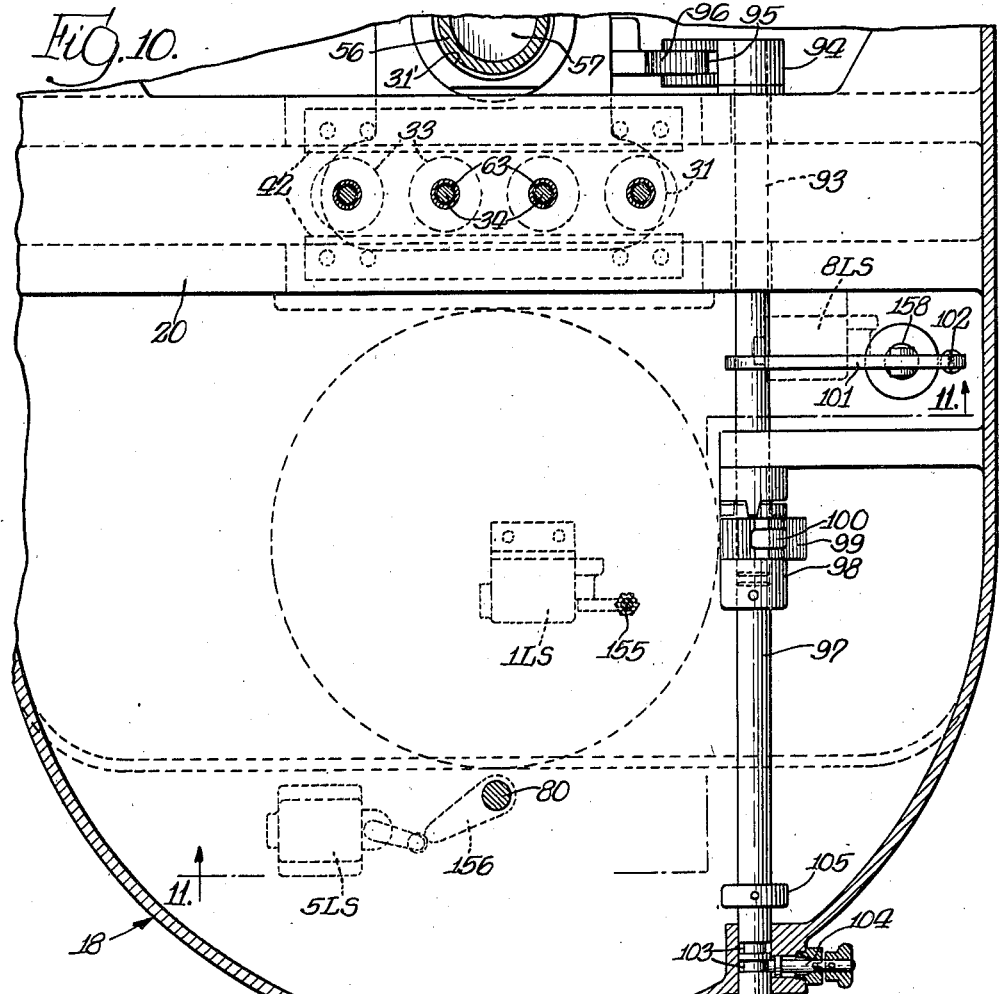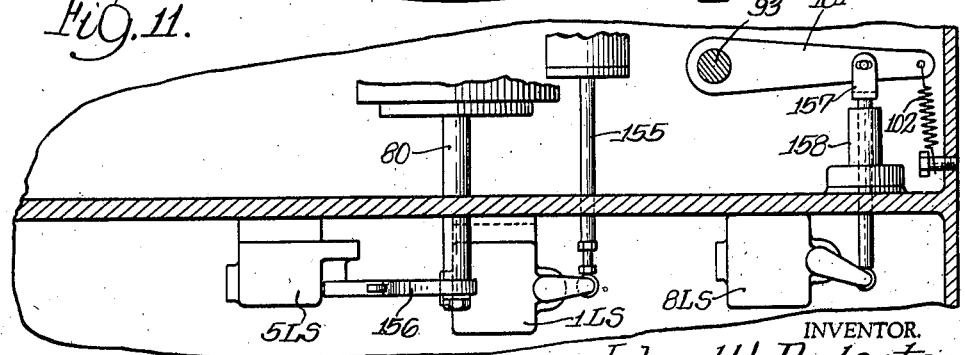

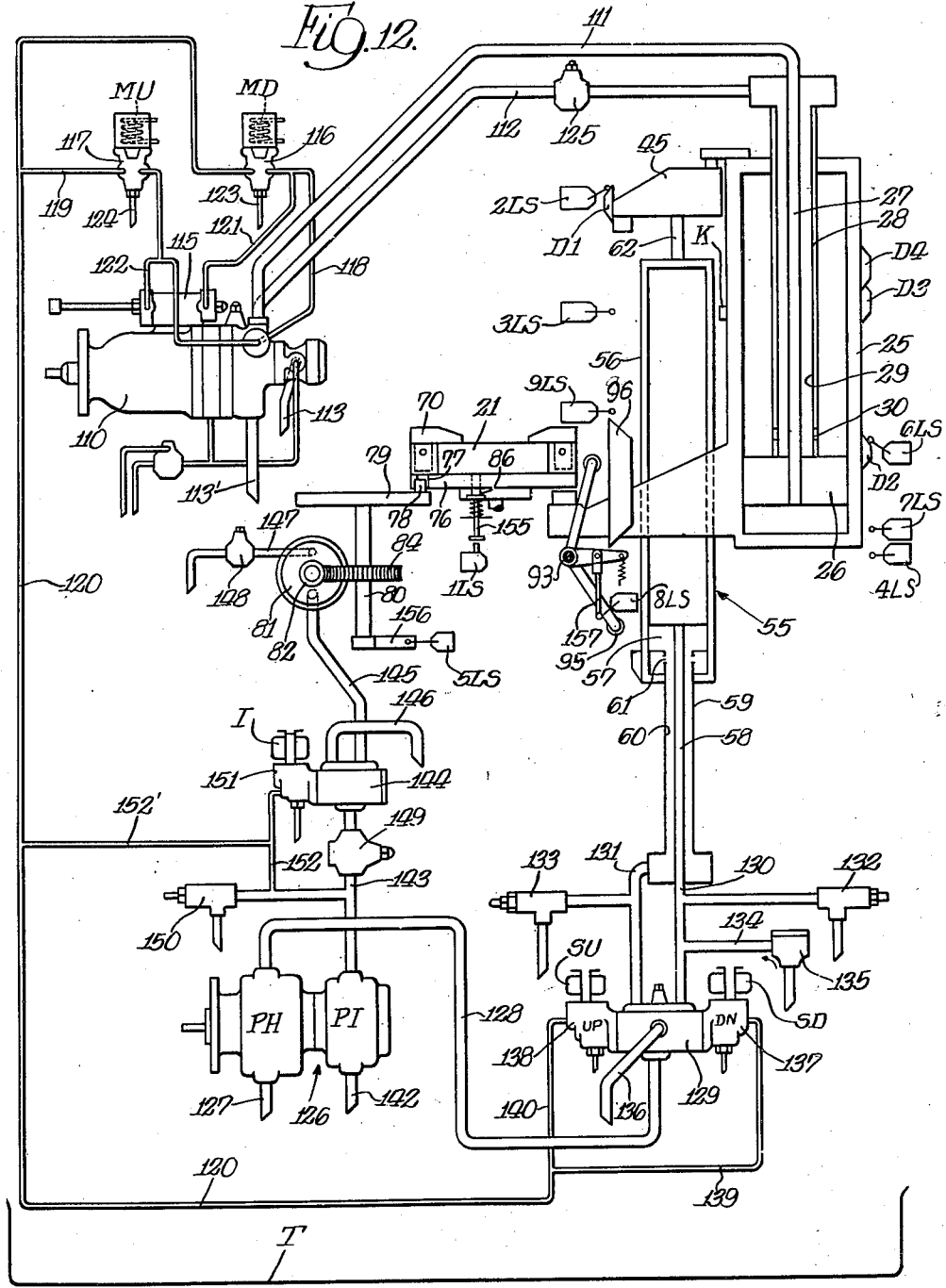

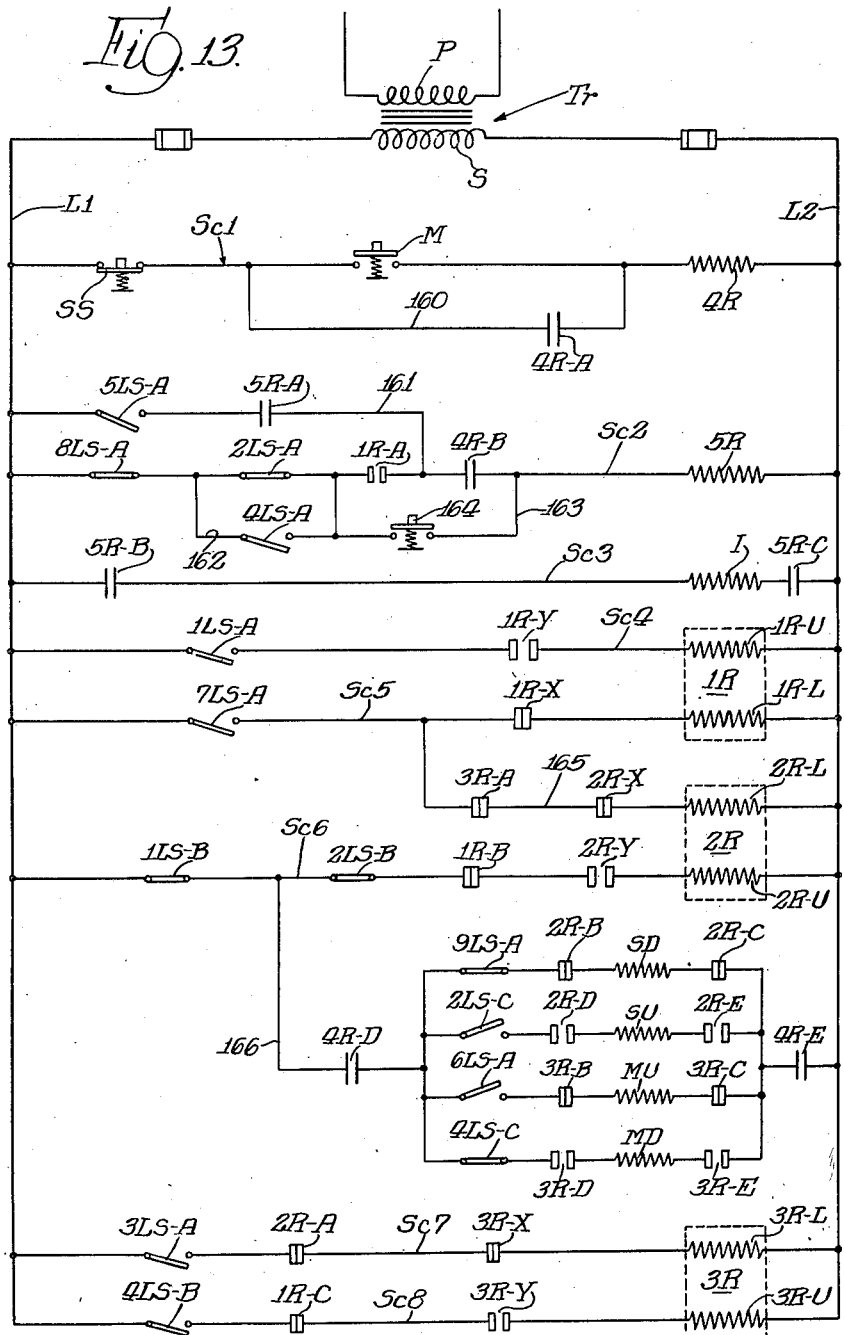

Patented Mar. 7, 1944

2,343,420

UNITED STATES PATENT OFFICE 2,343,420

BROACHING MACHINE

John W. Podesta, Ann Arbor, Mich., assignor to American Broach & Machine Co., Ann Arbor, Mich., a corporation of Michigan Application August 2, 1940, Serial No. 349,430

25 Claims. (Cl. 90—33)

The invention relates generally to broaching machines and more particularly to a broaching machine having a shiftable work support operable to move work pieces from a remote loading position to a position to be acted upon by the tools. It is the general object of the invention to provide a new and improved broaching machine of this type.

Another object is to provide a broaching machine having a broach actuating ram with a broaching and return stroke, an indexable work support with a loading position, a working position and a work discharge position, and means automatically operable to index the work support to its work discharge position at the end of the broaching stroke of the ram and to discharge the work during the return stroke of the ram.

Another object is to provide a broaching machine having a broach actuating ram with a broaching and a return stroke and an indexable work support with a loading position, a working position and a work discharge position, in which indexing of the work support to work discharge position is effected automatically at the end of the broaching stroke of the ram and in which completion of the indexing of the work support initiates the return stroke of the ram and the discharge of the work.

A further object is to provide a broaching machine having an indexable rotary work table with diametrically oppositely disposed work supports on the table permitting an operator standing at the front of the machine to load one of the supports while the machine is acting on work pieces in the other support, and means for indexing the table through quarter revolutions and for automatically discharging the finished work when the table is indexed 90° from working position.

Still a further object is to provide a broaching machine having a work table indexable to a loading position, a working position and an unloading position, tiltable work supports on the table yieldably urged to a normal work supporting position, and means cooperable with a work support when in unloading position to effect tilting thereof to discharge the work.

Another object is to provide an automatic pull broaching machine having automatic broach handling mechanism and an indexable work support which carries the work blanks to the broaches for the broaching operation and thereafter carries the work blanks to a discharge position.

Yet another object is to provide a broaching machine with a broach actuating ram having a broaching tool holder at one end thereof for releasably holding a broaching tool, a movably mounted device for handling the broach by its trailing end when detached from the broach holder and an indexable work support operable to move work pieces from a loading position to a broaching position and thereafter to a position intermediate the broaching and loading positions wherein the work support is out of the way of the broaches during a return movement of the broaches to the handling device.

Another object is to provide a broaching machine having a broach actuating ram with a broaching and a return stroke and a rotary indexable table with diametrically oppositely disposed work supports, the table being indexable through a first quarter revolution at the end of the broaching stroke to carry the finished work to a discharge position and to remove the work support from the path of the returning broaches, and indexable through a second quarter revolution at the end of the return stroke of the ram to present a new work blank to the broaches.

Still another object of the invention is to provide in such a machine a new and improved means for indexing the work support, a means for discharging the finished work pieces from the work support and novel mechanism for actuating and controlling the movement and timing of the various parts of the machine.

Yet a further object is to provide a broaching machine with a broach actuating ram having a broaching tool holder at one end thereof for releasably holding a broaching tool and a device for handling the broaching tool by its trailing end when detached from the broach holder including a head having detent means for releasably holding a broaching tool, the head in turn being releasably held in the device.

Other objects and advantages will become apparent from the following detailed description taken in connection with the accompanying drawings, in which:

Fig. 4 is a plan view showing the work supporting table in position for loading and broaching.

Fig. 5 is a fragmentary view partially in plan and partially in section taken approximately along the line 5—5 of Fig. 1 and showing the work supporting table in work discharge position.

Fig. 6 is a fragmentary front elevational view of that portion of the machine housing the work supporting table and table driving mechanism.

Fig. 7 is a greatly enlarged vertical sectional view taken approximately along the line 7—7 of Fig. 5 and showing the work supports in discharging position.

Fig. 8 is an enlarged horizontal plan view of the work supporting table drive mechanism, the table proper being removed.

Fig. 9 is an irregular vertical sectional view, on the same scale as Fig. 8, of the work supporting table and its driving mechanism, the table being in diametrical section, while the lower portion of the figure is broken away to a lesser depth.

Fig. 10 is a horizontal sectional view greatly enlarged, taken approximately along the line 10—10 of Fig. 1.

Fig. 11 is a vertical sectional view taken approximately along the line 11—11 of Fig. 10.

Fig. 12 is a diagrammatic view showing the hydraulic circuit and control devices.

Fig. 13 is a diagrammatic view of the electrical control crcuit.

Figure 1:
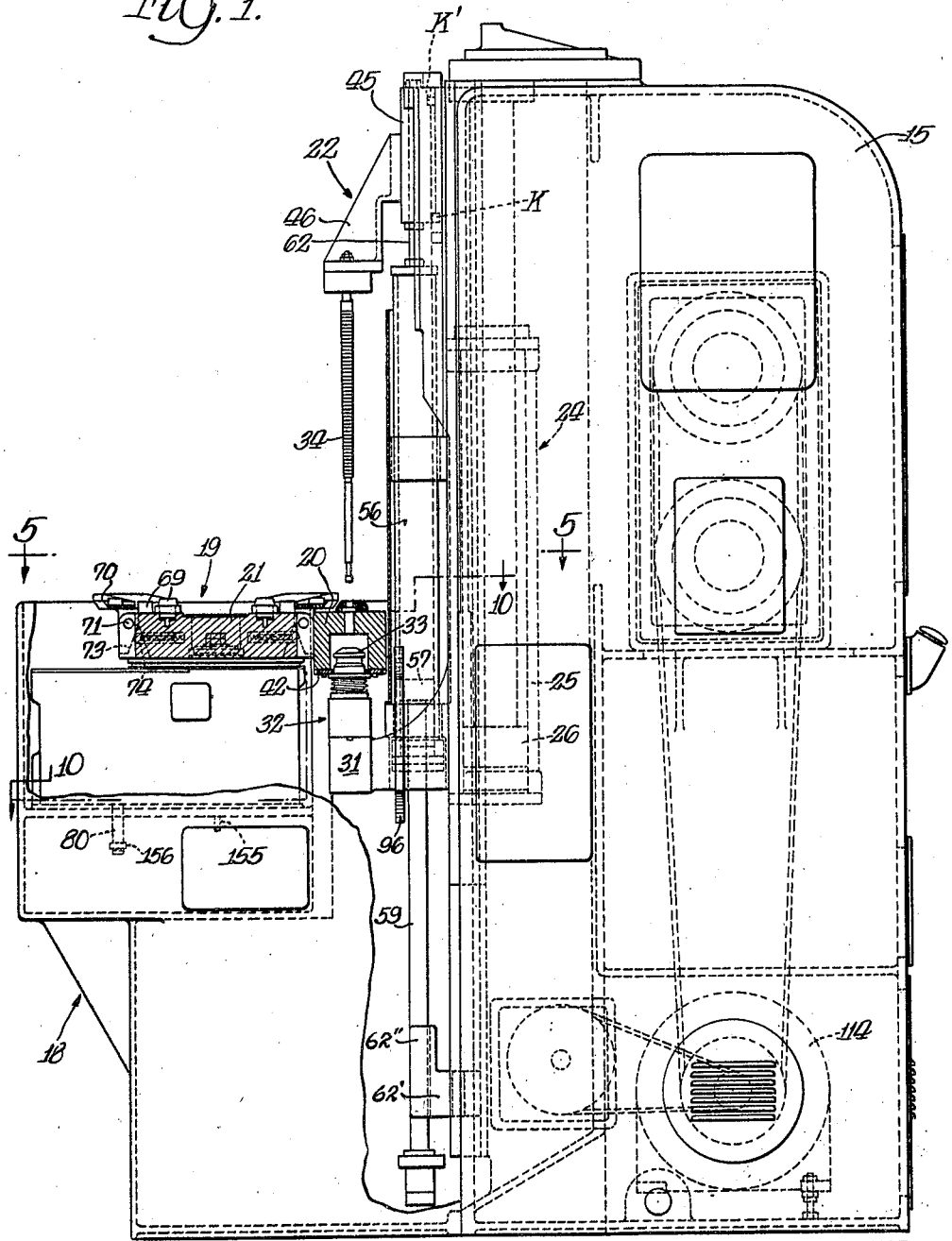
Fig. 1 is a side view partially in elevation and partially in section of a broaching machine embodying the features of the invention.

While the invention is susceptible of various modifications and alternative constructions, it is here shown in the drawings and will hereinafter be described in a preferred embodiment. However, it is not intended that the invention is thereby to be limited to the specific disclosure made. On the contrary, it is intended to cover all modifications and alternative constructions falling within the spirit and scope of the invention as defined in the appended claims.

Figure 2:
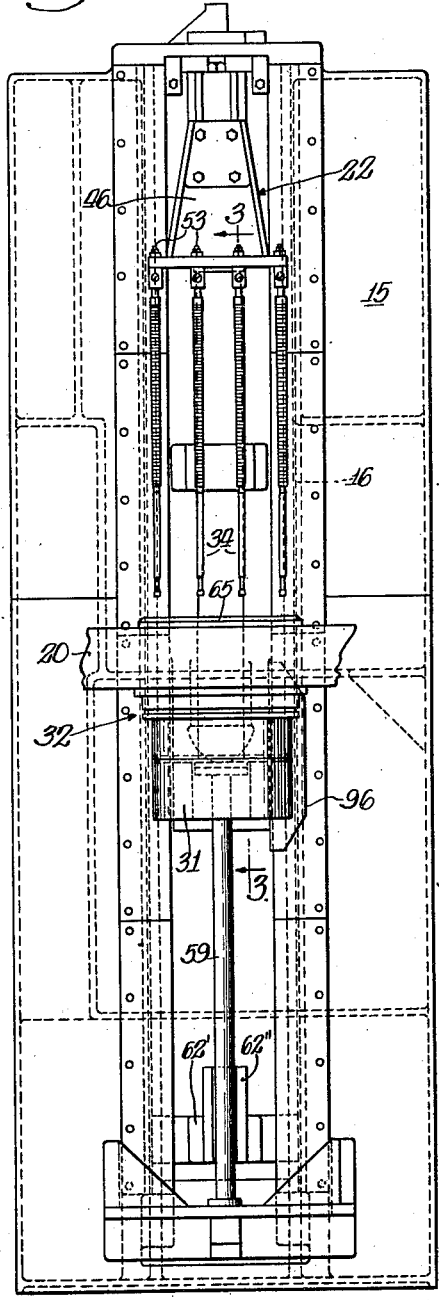
Fig. 2 is a front elevational view of the machine shown in Fig. 1, but with the work supporting bed and the driving mechanism contained therein removed.

For purposes of disclosure, the invention is here shown and will hereinafter be described as embodied in a broaching machine of the internal, pull-down type. Such a machine comprises generally an upright column 15 having formed in the front thereof (see Figs. 2 and 5) vertical ways 16 in which is reciprocable a main broach actuating slide 17. Disposed in front of the column 15 and extending upwardly approximately one-half of the height of the column is a bed 18 on which is mounted a work supporting means 19. This means includes a stationary beam 20 and an indexable work supporting table 21 which is loaded by an operator standing in front of the machine, and is operable to carry the work from the loading position first to a broaching position, where it is acted upon by the broaching tool, and thereafter carries the work to a discharge position where the work is automatically unloaded. Broach handling mechanism, generally designated 22, is provided and functions to support the broaching tool above the work support during the presentation of a new work blank and to initiate passage of the tool through the work blank. Suitable driving means for the main slide, the work supporting table and the broach handling mechanism are, of course, provided and are located within the bed 18 or the column 15.

The machine is automatic in operation, and to that end control means is provided for governing the operation of the various elements to assure their functioning in proper sequence. Briefly, the machine functions in the following manner: The machine is initially started and finally stopped manually by the operator, all other cycles of operation automatically repeating. In a cycle of operation, the broach handling mechanism first moves downwardly to pass the broaching tool through the work and into engagement with the main broach actuating slide, whereupon the main slide moves downwardly to pull the broach through the work. During the broaching operation, the operator loads a new work piece onto the table 21 and, upon completion of the broaching operation and while the main slide remains down, the table 21 is automatically indexed through 90° to carry the finished work piece to discharge position and also to free the path permitting the broaching tool to be returned to normal position supported by the broach handling means 22. Completion of the indexing of the table 21 initiates the return movement of the main slide and as an incident to such movement the finished work piece is discharged. Upon return of the broaching tool to normal position, the table 21 is again indexed, thereby presenting new work pieces to broaching position and the machine is ready for the cycle to be repeated.

The main broach actuating slide 17 is, as stated, reciprocable vertically in ways 16 formed in the front face of the column 15. This slide herein is driven hydraulically by a hydraulic motor 24 of the reciprocatory type comprising a cylinder 25 and a piston 26 (see Figs. 1, 3 and 5). The cylinder 25 is formed integrally with the slide 17 to form a ram, while the piston 26 is stationary having its rod rigidly anchored at its upper end in the top of the column 15. The piston rod comprises an inner hollow pipe 27 (see Fig. 12) which extends through the piston 26 to supply hydraulic fluid to the head end of the cylinder, and an outer larger and concentric pipe 28 which forms an annular passage 29 by which fluid is supplied through apertures 30 located near the piston 26 to the rod end of the cylinder. At its lower end, the slide 17 is formed with an integral, forwardly projecting bracket 31 carrying a broaching tool pull head, generally designated 32.

Figure 3:
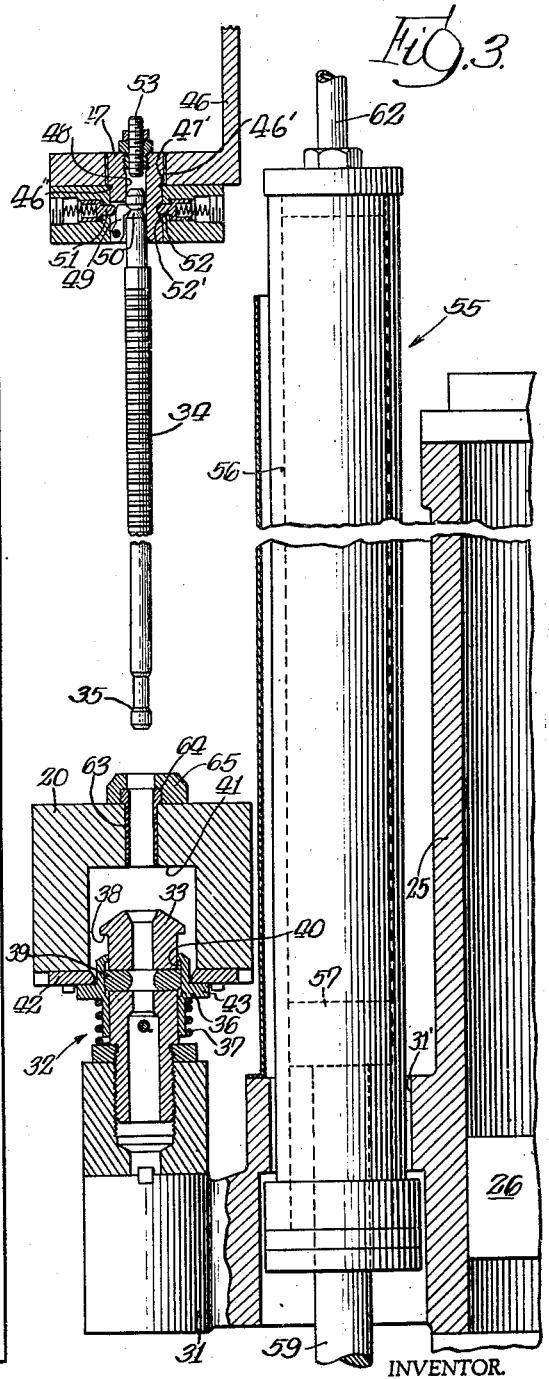
Fig. 3 is a greatly enlarged fragmentary vertical sectional view taken approximately along the line 3—3 of Fig. 2.

The pull head 32 is a multiple head consisting of a plurality, in the present instance four, individual heads of the general character disclosed and claimed in the Lapointe Patent No. 2,027,486. Each of the individual heads, as best seen in Fig. 3, comprises an elongated nipple 33 threaded into the bracket 31 and adapted to receive releasably one end of a broaching tool 34 conventionally formed with an annular groove 35 near the end thereof. Surrounding the nipple 33 and slidable longitudinally thereof is a sleeve 36 urged outwardly of the nipple by a compression spring 37 and limited in its outward movement by an annular shoulder 38 formed on the nipple near the outer end thereof. This sleeve controls a plurality of locking plungers 39 slidable radially of the nipple 33. To effect control over the plungers 39, the sleeve 36 is formed with an annular groove 40 internally thereof, which when disposed opposite the plungers 39 permits them to shift radially outwardly to an extent releasing the broaching tool 34. When, however, the sleeve is shifted so that the groove 40 no longer is opposite the plungers 39, they are held in locking engagement in the groove 35 of the broaching tool. In order to effect the release or engagement of the broaching tool, the plungers 39 are beveled at both ends and one side wall of the groove 40 is also beveled, as clearly seen in Fig. 3. The pull head 32 is at all times disposed below the stationary beam 20 which is formed in its underneath side with a recess or channel 41 to accommodate the upper end of the nipples 33. Adapted to strike trip plates 42 bolted to the underneath side of the beam 20, however, as the pull head approaches the position shown in Fig. 3, is an outwardly projecting flange 43 formed on the sleeve and by means of which the sleeve is shifted against the action of the spring 37 to release the plungers 39.

The end of the slide 17 opposite the bracket 31 is formed with a plurality of guideways 44 in which is reciprocable an auxiliary slide 45 constituting a part of the broach handling mechanism. This slide carries a bracket 46 in turn carrying four individual tool receiving heads. One of such heads is shown in section in Fig. 3 and comprises a sleeve 47 having an axial bore 48 in which the upper end of the broaching tool 34 is adapted to be received. The sleeve 47, as clearly shown in Fig. 3, is received in a stepped bore 46' in the bracket 46, the bore being stepped to form an annular shoulder 46''. Adapted to engage this shoulder to prevent relative movement of the parts in one direction is a shoulder 47' formed on the sleeve. The tool is yieldably retained in the sleeve 47 through a dog 49 pivotally mounted in the sleeve 47 and adapted to project into a groove 50 in the upper end of the broaching tool. Yieldably urging the dog 49 into engagement with the groove is a spring pressed plunger 51. The groove 50 in this tool has beveled side walls and the dog has a beveled nose so that upon the application of a certain pull on the tool the dog will be cammed out of the groove. As a safety measure, the sleeve 47 is in turn yieldably retained in the bracket 46 and to that end there is mounted in the bracket 46 a radially movable spring pressed detent 52 adapted to engage in a notch 52' formed in the outer surface of the sleeve 47. The notch 52' has one side wall beveled so as to permit the sleeve 47 to move upwardly should the broaching tool for any reason fail to enter the bore 48 or project too far into the bore. A limit stop in the form of a screw 53 is mounted in the end of the bore 48 opposite the end through which the broaching tool enters the bore to provide an adjustable limit against which the end of the broaching tool may abut.

Actuating the slide 45 of the broach handling mechanism is a hydraulic motor, generally designated 55 (see Figs. 1 and 3), which is of the reciprocatory type and comprises a cylinder 56 and a piston 57. As here shown, the piston 57 forms the stationary element of the motor and to that end is, through the medium of a double piston rod, anchored to the column 15 at the bottom thereof. An internal piston rod 58 (see Fig. 12) extends through the piston 57 so as to supply fluid to the head end of the cylinder, while an outer, larger and concentric rod 59 forms an annular passage 60 for conducting fluid through ports 61 to the rod end of the cylinder. The upper end of the cylinder 56 is connected by an adjustable rod 62 to the slide 45 of the broach handling mechanism. The motor 55 is disposed immediately in front of the main slide or ram 17 and passes freely through a bore 31' provided in the bracket 31 for that purpose. Preferably a shield 32'' extending upwardly from the bracket 31 is also provided. A positive stop for both the ram and the broach handling mechanism is provided. This takes the form of a bracket 62' projecting from the column 15 near its base. The bracket proper forms the stop for the ram while an upward extension 62'' forms the stop for the cylinder 56.

The slide 45 of the broach handling mechanism always remains above the beam 20, while the head 32 always remains below the beam though projecting partially thereinto, as previously described. Beam 20 is integral with the bed 18 to form a stationary part of the work supporting means, and the part on which the work rests and which bears the brunt of the strain during the broaching operation. To that end, the beam 20 is, of course, provided with suitable apertures through which the broaching tools 34 pass and, in the present instance, is formed with four such apertures (see Fig. 4). Each of the apertures (see Fig. 3) has a bushing 63 with an enlarged head 64. Mounted over the heads of the bushings is a channel-shaped member 65 (see particularly Figs. 3, 4 and 5) which is drilled to have apertures coinciding with the bore in the bushings 63 and which has an enlarged and beveled end 66 to aid the passage of the work blanks on top of the member 65.

The work supporting means, as above stated, includes an indexable work table 21 which is circular and is mounted for rotation on a stub shaft 67 journaled in the bed 18. Mounted on the table disposed diametrically opposite one another are two sets of work supports, generally designated 68. Each such work support is composed of stationary means 69 formed on the top of the table 21 and a plate 70 pivoted on the table at 71. The work supports 68 are, of course, designed to accommodate the particular work blanks to be broached. In the present instance, the machine is intended for the broaching of connecting rods and hence the plate 70, as best seen in Figs. 4 and 5, is formed with four pockets 72 each designed to hold a connecting rod. It is to be understood, of course, that the plate 70 could be varied to accommodate different types of work blanks. Depending from each plate 70 is a finger 73 which is engaged by a spring pressed plunger 74, in order normally to retain the plate 70 in work supporting position which, in the present instance, is its horizontal position. Both the finger 73 and the table 21 are beveled (see Fig. 9) to permit the finger 73 to swing inwardly and thereby tilt the plate 70 to a position from which the work blanks will be discharged radially outwardly and downwardly (see Fig. 7).

In order that work blanks may be carried from a loading to a broaching position and thereafter to a discharge position, all in timed relation and coordinated with the movements of the ram and broach handling mechanism for maximum efficiency, means is provided for indexing the table 21 through quarter revolutions. This means includes a Geneva mechanism (Figs. 8 and 9) comprising a disk 76 rigid with the bottom of the table 21 and provided with intersecting, diametrical and perpendicular grooves 77. Adapted to engage in the grooves 77 is a follower 78 carried by a quadrant 79 rigid on a shaft 80 journaled in the bed 18. The shaft 80 is driven from a rotary hydraulic motor 81 through a worm 82 on a shaft coupled to the motor shaft 83 and a worm wheel 84 fixed on the shaft 80. It is to be understood, of course, that the diameter of the quadrant and of the disk 76, as well as the spacing of the shafts 67 and 80, is such that upon rotation of the quadrant 79 the follower 78 will enter one of the grooves 77 and operate therein to rotate the table through 90° and will thereafter leave the groove and, during the remainder of the revolution of the quadrant 79, return to initial starting position to enter the end of a groove 77 spaced 90° from the groove previously entered.

Means is also provided for positively locking the table 21 in its various positions. To that end, the disk 76 is provided with four sockets 85, while reciprocably mounted in the bed 18 is a locking plunger 86 for cooperative engagement with the sockets 85. The plunger 86 is urged to locking engagement by a compression spring 87 and is disengaged from a socket 85 and held in disengaged position during the indexing of the table 21 through the medium of a cam follower 88, carried by the plunger, and a cam 89 carried on the underneath surface of the quadrant 79. The cam is of a length such that the plunger is withdrawn prior to engagement of the follower 78 with a groove 77, and held withdrawn until the follower 78 has left the groove in the disk 76.

The finished work pieces herein are automatically discharged after the table has been indexed to its discharge position (shown in Fig. 5), as an incident to the return movement of the broaching ram. To that end, there is journaled in the bed 18 a shaft 93 extending from the rear toward the front of the machine. At its rear end, this shaft has secured non-rotatably thereto a lever 94 (Figs. 7, 10 and 11) carrying a follower 95 adapted to be engaged by a cam 96 carried by the main broach actuating slide 17. Extending coaxially with the shaft 93 is a shaft 97 connected with the shaft 93 through a coupling 98. Non-rotatably mounted on the shaft 97 is a lever 99 carrying a follower 100 at its free end adapted when the shaft is rotated in a counter-clockwise direction, as viewed in Fig. 7, to strike the finger 73 to tilt the plate 70 of the work support for the purpose of discharging the work pieces. Also non-rotatably fixed on the shaft 93 is a lever 101 which is engaged at its free end by a tension spring 102, the other end of which is anchored to the frame of the bed 18, and which serves to urge the shaft 93 and hence the arm 99 to an inactive position. The shaft 97 projects through the front wall of the bed 18, at which point it is formed with a pair of axially spaced grooves 103. Engageable in one or the other of these grooves is a pin 104 yieldably urged inwardly and manually withdrawable to permit the shaft 97 to be shifted axially. When engaged in a groove 103, as shown in Fig. 10, the shaft 97 is coupled to the shaft 93, but when the shaft is shifted outwardly until the pin 104 engages in the inner one of the grooves 103 the shafts 97 and 93 are disconnected. A collar 105 prevents the shaft 97 from being pulled outwardly too far and the projecting end of the shaft has extending transversely therethrough a hand pin 106.

Hydraulic circuit means is provided for supplying fluid to the various hydraulic motors at the times and in the quantities and directions necessary to bring about the desired operation of the broaching machine. This hydraulic circuit comprises a main pumping unit 110 composed of a variable delivery piston type main pump, of the general type disclosed and claimed in the Gunnar A. Wahlmark application, Serial No. 228,966, filed September 8, 1938, Patent No. 2,232,984, patented February 25, 1941, a charging or make-up pump, and a hydraulically shifted reversing valve all housed in the same casing. The pumping unit has a first port connected by a conduit 111 to the inner piston rod 27 of the hydraulic motor 24, a second port connected by a conduit 112 to the annular passage 29 formed by the outer piston rod 28, an intake port for the make-up pump connected by a conduit 113 to a reservoir or tank T to draw from the tank fluid to compensate for the difference in volume of opposite ends of the cylinder 25, and a discharge port connected to the tank T by a conduit 113'.

An electric motor 114 housed in the column 15 drives the pumping unit 110 continuously in one direction and reversal of fluid discharge from the pumping unit is effected by shift of the reversing valve, while variation in displacement is effected by adjustment of the stroke of the piston under the control of a hydraulic motor 115. The motor 115 and the reversing valve are in turn controlled by a pair of pilot valves 116 and 117 which are spring urged to a normal position and are shifted to actuated position by the energization of solenoid coils MD and MU, respectively. The valves 116 and 117 are connected in a pilot circuit which includes a conduit 118 in which the valve 116 is interposed and a conduit 119 in which the valve 117 is interposed. These conduits connect at one end to the opposite ends of the reversing valve and at the other end join to form a common conduit 120 leading to the pressure source as will presently become apparent. Connected at one end to one end of the governing motor 115 and joining at the other end with the conduit 118 intermediate the pumping unit and the valve 116, is a conduit 121, while a conduit 122 is similarly connected to the conduit 119 and to the opposite end of the motor 115 to supply fluid to one end or the other of the motor 115 in accordance with the shift of the valves 116 and 117. Exhaust fluid is returned to the tank through conduits 123 and 124. A suitable back pressure check valve 125 is interposed in the conduit 112 to permit free flow of the fluid when supplied to the rod end of the cylinder 25 for the purpose of effecting a return stroke, but which maintains the fluid discharged from the rod end of the cylinder under a predetermined back pressure to assure a uniform movement of the slide during a broaching stroke.

Fluid for actuating the motor 55 of the broach handling mechanism and the indexing motor 81 is supplied, respectively, by pumps PH and PI of a double pump unit 126 which also is continuously driven by the electric motor 114. The pump PH has an intake port connected with the tank T through a conduit 127 and a discharge port connected by a conduit 128 to a reversing valve 129. The reversing valve 129 is in turn connected by a conduit 130 to the inner piston rod 58 and by a conduit 131 to the annular passage 60 formed by the outer piston rod 59 of the motor 55. Relief valves 132 and 133 are, respectively, connected to the conduits 130 and 131 to permit discharge to the tank under abnormal conditions, while also connected to the conduit 130 and communicating with the tank is a conduit 134 which includes a check valve 135 arranged to prevent flow to the tank but to permit fluid to be drawn into the head end of the cylinder 56 to make up the deficiency during the time that the slide 45 is raised by the main slide at a rate greater than the rate of fluid supply to the head end of the cylinder by the pump PH. A return conduit 136 leads from the valve to the tank T.

Shift of the reversing valve 129 is again effected hydraulically under the control of pilot valves 137 and 138, respectively shiftable from normal position by energization of solenoid coils SD and SU. Energization of the SD coil and resultant shift of the valve 137 causes operating fluid to be supplied to the rod end of the cylinder 56 to effect a downward movement of the slide 45. Conversely, energization of the SU coil with its resultant shift of the valve 138 causes fluid to be supplied to the piston end of the cylinder 56 to effect a return movement of the slide 45. The operating fluid for effecting the shift of the reversing valve 129 is supplied to the pilot valves through branch conduits 139 and 140 into which the conduit 120 divides.

The circuit for the indexing motor 81 comprises an intake conduit 142 for the pump PI and a discharge conduit 143 leading from the pump to a start and stop valve 144. Leading from the valve 144 is a conduit 145 connected to the intake port of the motor 81 and a conduit 146 leading to the tank T. Fluid is exhausted from the motor 81 and returned to the tank through a conduit 147 which has interposed therein a back pressure check valve 148. The conduit 143 has interposed therein a back pressure valve 149 to maintain a predetermined pressure for the pilot circuit when the valve 144 permits discharge to the tank T, and has connected thereto a relief valve 150 permitting discharge to the tank under abnormal conditions.

Shift of the start and stop valve 144 is under the control of a pilot valve 151, similar to the valves 137 and 138, and is in turn governed by a solenoid coil I. Pilot fluid for governing the position of the valve 144 is supplied to the pilot valve 151 through a conduit 152 communicating with the conduit 143 in advance of the back pressure valve 149. A branch conduit 152' connects to the conduit 120 to supply fluid to the remainder of the pilot circuit. Energization of the solenoid coil I functions to shift the valve 144 in a direction to permit the pump PI to supply fluid to the indexing motor 81. The valves 137, 138 and 151 are, of course, provided with conduits leading to the tank T permitting the exhaust of fluid from the valves 129 and 144.

The various solenoid coils just mentioned are connected in an electrical control circuit (see Fig. 13) which also includes a plurality of automatically actuated or manually actuated switches and relays functioning to energize the solenoid coils at proper times so as to effect automatic operation of the broaching machine once the same has been started by manual manipulation of a starting switch. The automatically actuated switches include limit switch devices 1LS, 2LS, 3LS, 4LS, 5LS, 6LS, 7LS, 8LS and 9LS (see Fig. 12). Each of these limit switch devices has a normal position to which it tends to return, a tripped position in which it remains only so long as physically held, and each is adapted to control one or more circuits and to that end is composed of one or more switches. Of these limit switch devices, 2LS, 3LS and 9LS are adapted to be tripped at various times by a dog D1 carried on the slide 45. The device 2LS has three switches 2LS—A, 2LS—B and 2LS—C (see Fig. 13) of which the 2LS—A and 2LS—B switches are normally open and the 2LS—C switch is normally closed. The 3LS device has but a single switch 3LS—A which is normally open, and likewise the 9LS device has but a single switch 9LS—A which is normally closed.

Switch devices 6LS, 7LS and 4LS are adapted to be actuated by dogs D2, D3 and D4, respectively, mounted on and carried by the main slide 17. Both the devices 6LS and 7LS have but a single switch 6LS—A and 7LS—A, respectively, the first of which is normally closed and the second normally open. The 4LS device has three switches 4LS—A, 4LS—B and 4LS—C, of which 4LS—A and 4LS—B are normally open and 4LS—C is normally closed. The 1LS device is governed by the table locking plunger 86 which for that purpose has depending therefrom a rod 155 which serves to trip the device when the plunger is withdrawn to free the table 21. The 1LS device has two switches, 1LS—A which is normally open, and 1LS—B which is normally closed. Also related in its control to the indexable work table 21 is the switch device 5LS having a single switch 5LS—A which is normally closed. This switch device is governed by an arm 156 which rotates with the shaft 80 of the worm wheel 84 and the quadrant 79. The remaining limit switch device 8LS also has but a single switch 8LS—A which is normally open. This device is controlled by the mechanism for effecting tilt of the work supporting plates 70 to work discharge position and is held tripped when the mechanism is in normal position. To effect such control over the switch device 8LS, there is pivotally connected to the arm 101 a depending rod 157 which is guided for sliding movement in a bearing 158 and terminates above the actuating arm of the switch device 8LS.

The electrical control also includes a plurality of relays 1R, 2R, 3R, 4R and 5R. Of these the relays 1R, 2R and 3R are latched relays each having two coils designated in the circuit diagram (Fig. 13) by the reference character applied to the relay plus an L and a U, respectively. Each relay has two positions to which it is shifted by temporary energization of the appropriate coil and in which it is held by mechanical detent means until the other coil is energized. The relay 1R has five switches 1R—A, 1R—B, 1R—C, 1R—X and 1R—Y. Upon energization of the coil 1R—U, switches 1R—A and 1R—Y are open while switches 1R—B, 1R—C and 1R—X are closed. The switches, of course, assume the opposite position after energization of the 1R—L coil. The relay 2R has seven switches 2R—A, 2R—B, 2R—C, 2R—D, 2R—E, 2R—X and 2R—Y. Of these, 2R—A, 2R—B, 2R—C and 2R—X are closed after energization of the coil 2R—U, while switches 2R—D, 2R—E and 2R—Y are open. Relay 3R is identical with relay 2R. In each of the relays the 2R—X switch is in series with the L coil, while the 2R—Y switch is in series with the U coil and, as will be seen from the above description, the 2R—X switch is opened upon energization of the L coils, while the 2R—Y switch is opened upon energization of the U coil. This is for the purpose of assuring temporary energization of the coils only, the latched character of the relays and particularly the cooperation of the detent means making this arrangement possible.

The relays 4R and 5R are not latched relays, but are ordinary relays having but a single coil, designated in Fig. 13 as 4R and 5R, respectively. The relay 4R has four switches 4R—A, 4R—B, 4R—C and 4R—D, which are all normally open when the relay is deenergized and which are closed upon energization of the relay coil 4R. Relay 5R has three switches 5R—A, 5R—B and 5R—C which also are open when the relay is in normal condition, namely, with the relay coil 5R deenergized, and which close upon energization of the coil 5R. It will become apparent as the description of the circuit and of the operation of the machine proceeds that the relays 1R and 5R govern the indexing of the table, that the relay 2R controls the pilot valves governing the direction of fluid flow to the motor of the broach handling mechanism, that the relay 3R controls the pilot valves governing the direction of fluid flow to the main slide motor, while relay 4R is a monitor or master relay.

The various solenoid and relay coils and the various limit and relay switches are connected in a control circuit shown diagrammatically in Fig. 13, which comprises a transformer Tr having a primary winding P connected to a high voltage source, and a secondary S having its ends connected to lead wires L1 and L2. Connected between the wires L1 and L2, in a plurality of minor or subcircuits, are the various switches and coils. A first such subcircuit Sc1 includes in series the relay coil 4R, a normally open, manually actuable starting switch M, and a normally closed, manually actuable stop switch SS. Connected around the start switch M in a shunt circuit 160 is the switch 4R—A which forms a holding circuit for the relay coil 4R. Connected in series to form a second subcircuit Sc2 are the switches 8LS—A, 2LS—A, 1R—A, 4R—B and the coil 5R of the 5R relay. Connected about the switches 8LS—A, 2LS—A and 1R—A is a shunt circuit 161 including in series the switches 5LS—A and 5R—A. Connected about the switch 2LS—A is a shunt circuit 162 which includes the switch 4LS—A and connected about the switches 1R—A and 4R—B is a shunt circuit 163 which includes a normally open, manually actuable switch 164 adapted for inch indexing of the work supporting table. The solenoid coil I and the switches 5R—B and 5R—C are connected in series between the line wires L1 and L2 to form a subcircuit Sc3, and a fourth subcircuit Sc4 is formed by the series connection of the switches 1LS—A, 1R—Y and the 1R—U coil. A fifth subcircuit Sc5 includes in series connection the coil 1R—L and switches 1R—X and 7LS—A and includes a shunt circuit 165 connected around the switch 1R—X and the coil 1R—L having in series the switches 3R—A and 2R—X and the coil 2R—L. A sixth subcircuit Sc6 includes in series the switches 1LS—B, 2LS—B, 1R—B and 2R—Y and the coil 2R—U. Connected about the coil 2R—U and all the switches save 1LS—B is a shunt circuit 166 which includes in series the switches 4R—D and 4R—E. Connected between these last named switches in four parallel circuits are the solenoid coils SD, SU, MU and MD for the valves 137, 138, 117 and 116, respectively. In series with the coil SD are switches 9LS—A, 2R—B and 2R—C. In series with the coil SU are the switches 2LS—C, 2R—D and 2R—E. In series with the coil MU are the switches 6LS—A, 3R—B and 3R—C. In series with the coil MD are the switches 4LS—C, 3R—D and 3R—E. A seventh subcircuit Sc7 is formed by the series connection between the line wires L1 and L2 of the switches 3LS—A, 2R—A and 3R—X and the coil 3R—L, while an eighth and final subcircuit Sc8 includes in series connection the switches 4LS—B, 1R—C and 3R—Y and the coil 3R—U.

In order better to understand the sequence of movements of the broaching machine, as well as the functions of the various switch devices, valves, and so forth, the operation of the machine will be described briefly. For that purpose, let it be assumed that the machine is idle in its normal starting position, that is, with the slide 45 of the broach handling mechanism and the main broach actuating slide both in their uppermost positions, and with the table 21 disposed with one work support in the broaching position, while the other work support is at the front of the machine where it can be loaded by the attendant. It is to be assumed further that unfinished work blanks are mounted in the work support which is in broaching position. Under these conditions the limit switch device 2LS will be tripped by the dog D1 on the slide 45, the device 6LS will be tripped by the dog D2 on the main slide, switch device 5LS will be tripped by the arm 156, and switch device 8LS will be tripped by the rod 157 of the work support tilting mechanism. The other switch devices will be in their normal position, relays 4R and 5R will be deenergized and all their switches open, all of the solenoid coils of the pilot valves will be deenergized, while the coils of the relays 1R, 2R and 3R will also be deenergized. In short, the switches will assume the positions shown in Fig. 13. To start operation, the attendant first starts the electric motor 114, which drives the pumps and then momentarily presses the start button M, thereby completing the subcircuit Sc1 to energize the 4R relay coil. Such energization of the coil 4R closes all of the switches of the 4R relay, among other things, to establish a holding circuit for the relay through the closure of the 4R—A switch and to complete the shunt circuit 166 which includes the coils SD and SU governing operation of the slide 45 through the closure of the switches 4R—D and 4R—E. As a consequence, the slide 45 is started on its forward or, in this instance, downward stroke, since a circuit is now completed through the switches 1LS—B, 4R—D, 9LS—A, 2R—B, 2R—C and 4R—E to energize the coil SD of the valve 137. Such shift of the valve 137, due to energization of the coil SD, causes the reversing valve 129 to shift so that fluid is supplied to the rod end of the motor 55. With the initial forward movement of the slide 45, the switch device 2LS is permitted to return to normal position, as a result of which its switches 2LS—A and 2LS—B are opened, while its switch 2LS—C is closed partially to condition the circuit including the SU coil, the later energization of which will initiate the return movement of the slide 45.

The slide 45 continues to move downwardly alone and relative to the slide 17 carrying its broaches through the work pieces, the stationary work supporting beam 20, and into the pull head 32 disposed beneath the beam 20. At the time that the lower ends of the broaches are received in the pull head, the dog D1 temporarily trips the switch device 3LS, thereby temporarily closing its switch 3LS—A which is normally open. Closure of the switch 3LS—A completes the subcircuit Sc7 temporarily to energize the relay coil 3R—L. Such energization of the 3R—L coil shifts the relay to open its 3R—X switch deenergizing the 3R—L coil, closing its 3R—Y switch preparatory to a subsequent energization of the 3R—U coil, opening its 3R—B and 3R—C switches and, above all, closing its 3R—D and 3R—E switches. Closure of these latter switches completes a circuit energizing the coil MD of the pilot valve 116, which results in the pumping unit 110 supplying fluid to the head end of the cylinder 25 to initiate the broaching stroke of the main broach actuating slide. With the initial movement of the main broach actuating slide, the limit switch device 5LS is permitted to return to normal position resulting in a closure of its switch 6LS—A. Such closure, however, is ineffective to energize the coil MU because of the previous opening of the switches 3R—B and 3R—C.

The slide 45 and the main slide now continue downwardly in unison through the broaching stroke until the dog D1 trips the limit switch device 9LS, opening its switch 9LS—A and thereby deenergizing the coil SD. With such deenergization of the coil SD, the valve 137 is returned to normal position and the reversing valve 129 is returned to neutral position stopping movement of the slide 45. The main slide, however, continues downwardly to complete the broaching operation and to withdraw the broach from the broach handling heads of the slide 45 and through the work supports on the table 21. During the broaching stroke of the main slide, the dog D3 temporarily trips the switch device 7LS, temporarily to close its switch 7LS—A. Such closure of the switch 7LS—A completes the subcircuit Sc5 to energize the relay coil 1R—L, resulting in the opening of the relay switches 1R—B, 1R—C and 1R—X and closing of the switches 1R—A and 1R—Y. No immediate change takes place as a result, but the opening or closing of the certain switches serves to condition the circuits in which they are included for future operation, as will presently become apparent.

At the end of the broaching stroke of the main slide 17, dog D4 trips the limit switch device 4LS, thereby closing its switches 4LS—A and 4LS—B and opening its switch 4LS—C. Opening of the switch 4LS—C deenergizes the coil MD of the pilot valve 116, thereby to arrest the broaching stroke of the main slide. Closure of the switch 4LS—B accomplishes nothing because switch 1R—C is open. However, closure of switch 4LS—A completes a circuit to the relay coil 5R through the switches 8LS—A, 4LS—A, 1R—A and 4R—B which are now all closed. Energization of the coil 5R results in a closure of all of the relay switches 5R—A, 5R—B and 5R—C, the closure of 5R—B and 5R—C resulting in the completion of the subcircuit Sc3 to energize the coil I. With the energization of the I coil, the pilot valve 151 is shifted in turn to effect a shift of the valve 144, permitting flow of operating fluid to the indexing motor 81, resulting in commencement of the indexing operation.

With the initial rotation of the shaft 80 and the quadrant 79 nonrotatably fixed therewith, the arm 156 releases the switch device 5LS to permit its reutrn to normal, resulting in a closure of its switch 5LS—A. Closure of this switch establishes a circuit for the coil 5R which is independent of the switch 1R—A which will presently be opened to place sole control over the indexing motor 81 in the switch device 5LS. Also, with the initial rotation of the shaft 80, the cam 89 on the quadrant 79 engages the cam follower 88 to withdraw the locking plunger 86 and at the same time through the rod 155 trip the switch device 1LS. Tripping of the switch device 1LS opens its switch 1LS—B, rendering the MU and MD coils incapable of energization and closes 1LS—A which completes the subcircuit Sc4 to energize the coil 1R—U. Energization of the 1R—U coil of the relay 1R opens the relay switches 1R—Y and 1R—A, opening of the latter placing the switch 5LS—A in full control of the indexing motor, as above stated. Energization of the 1R—U coil also results in a closure of switches 1R—X and 1R—B, which closure has no effect save to condition circuits for future use, and closure of switch 1R—C completes the subcircuit Sc8 energizing coil U of the relay 3R. Energization of the 3R—U coil in turn effects closure of the relay switches 3R—A, 3R—B, 3R—C and 3R—X. However, closure of switches 3R—B and 3R—C does not initiate upward movement of the main slide because 1LS—B is still open. The switches 3R—D, 3R—E and 3R—Y are also opened as a result of energization of 3R—U.

When the indexing of the table 21 is complete, that is, when it has been rotated through 90° so as to carry the work blanks from broaching position to an unloading position, the cam 89 disengages from the follower 88 permitting the plunger 86 to engage with a socket in the table 21 to lock the same and, incidental thereto, the switch device 1LS is returned to normal position. With such return to normal position, its switch 1LS—A is opened and its switch 1LS—B is closed. Opening of the switch 1LS—A has no effect, but closure of the switch 1LS—B results in completion of the circuit including the coil MU, which circuit had been previously conditioned by closure of the switches 3R—B and 3R—C. Return movement of the main slide is now initiated, since the energization of the coil MU causes the pumping unit 110 under the control of the pilot valve 117 to supply fluid to the rod end of the cylinder 25. Some time after the initiation of the return stroke of the main slide, the shaft 80 completes its revolution, causing the arm 156 to trip device 5LS, thereby opening switch 5LS—A and arresting operation of the indexing motor 81.

With the initial return movement of the main slide, the switch device 4LS is permitted to return to normal, resulting in the opening of its switches 4LS—A and 4LS—B, and closing of its switch 4LS—C. Nothing transpires immediately from this change, not even from the closure of 4LS—C, for the switches 3R—D and 3R—E are open. During the return movement of the main slide, the cam 96 carried thereon engages the follower 95 to rock shaft 93 and shaft 97 and the lever 99 normally coupled thereto. Such rocking of the shaft 97 tilts the work support 70 which carries the finished work pieces causing the same to be discharged. At the same time, rocking of the shaft 93 through the rod 157 trips the switch device 8LS to open its switch 8LS—A. The switch is, of course, again closed immediately upon return of the work support to its normal horizontal position.

During the return stroke, the main slide initially moves alone and relative to the broach handling slide 45 until the upper ends of the broaches are restored to the heads in the slide 45, which takes place about the same time that the key K on the main slide engages key K' on the slide 45. Prior to such engagement of the key K with the slide 45, the dog D3 momentarily trips the switch device 7LS, temporarily closing its switch 7LS—A. Such temporary closure of the switch 7LS—A completes circuits energizing both the 1R—L and the 2R—L coils. Energization of the 1R—L coil of the relay 1R causes its switches 1R—B, 1R—C and 1R—X to be opened and its switches 1R—A and 1R—Y to be closed, but no immediate change is effected. Energization of 2R—L opens the relay switches 2R—B, 2R—C and 2R—X and closes the relay switches 2R—D, 2R—E and 2R—Y. Closure of the switches 2R—D and 2R—E completes a circuit to the coil SU of the pilot valve 138, thereby effecting a shift in the reversing valve 129 in such direction that fluid is supplied to the head end of the cylinder 56. The broach handling slide 45 and the main slide now move through their return stroke in unison.

With the initial return movement of the slide 45, the switch device 9LS is, of course, released and permitted to return to normal, resulting in a closure of its switch 9LS—A. Closure of this switch, however, does not energize the coil SD since the switches 2R—B and 2R—C have previously been opened as a result of the energization of the 2R—L coil. During the return movement of the slide 45, the dog D1 also temporarily trips the switch device 3LS, but, like the switch 9LS, is ineffective because the switch 2R—A is open at such time. The two slides continue in unison until the dog D2 trips the switch device 6LS, effecting an opening of the switch 6LS—A. Because of the opening of the switch 6LS—A, the circuit to the coil MU is broken and, with the deenergization of the coil, the pumping unit 110 discontinues supplying operating fluid whereby the main slide comes to rest in its uppermost normal starting position. The slide 45 now continues in its return movement independently of the main slide and until its dog D1 trips the switch device 2LS.

With the tripping of the device 2LS, its switch 2LS—C is opened to deenergize the coil SU, resulting in a return of the reversing valve 129 to neutral position and cessation of flow of fluid to the motor 55 of the broach handling mechanism bringing the slide 45 to a stop in its uppermost normal starting position. Tripping of the device 2LS closes its switches 2LS—B and 2LS—A, closure of the latter serving to complete a circuit energizing the coil 5R. This results in closure of all of the 5R relay switches, namely 5R—A, 5R—B and 5R—C to again partially establish a holding circuit for the relay 5R and to complete the subcircuit Sc3 to energize the coil I. With the energization of the coil I, the indexing motor 81 is started, as previously described, and with the initial operation of the motor the switch device 5LS is permitted to return to normal, while the switch device 1LS is tripped. Return of the switch device 5LS to normal closes its switch 5LS—A to complete the holding circuit for the relay coil 5R. Tripping of the switch device 1LS opens 1LS—B again to render all of the solenoid coils on the pilot valves incapable of energization and closes 1LS—A to energize 1R—U. Energization of 1R—U opens 1R—A to place 5R under the sole control of the switch 5LS and closes 1R—B and 1R—C to condition circuit to 2R—U. With the completion of the indexing of the table, that is, the rotation of the same through 90° which has now again placed one of the work supports in the broaching position, while the other is at the front of the machine ready to be loaded by the attendant, the table is locked and the switch device 1LS returned to normal. Such return to normal opens its switch 1LS—A and closes its switch 1LS—B to complete the subcircuit Sc6 and energize the coil 2R—U. Such energization of the coil opens the relay switches 2R—D and 2R—E and closes the relay switches 2R—A, 2R—B and 2R—C. Closure of the latter two completes the circuit to the coil SD of the pilot valve 137, initiating a new cycle of operation of the broaching machine.

I claim as my invention:

1. An internal broaching machine comprising, in combination, broach actuating mechanism including a slide having a broaching tool holder at one end thereof for releasably holding a broaching tool and means for actuating the slide through a broaching stroke and a return stroke, a movably mounted device for handling the broaching tool by its trailing end when detached from the broach holder, means for actuating said device, an indexable work support, means actuating said support to transport a work piece from a loading position to a broaching position and thereafter from the broaching position to a discharge position, and means automatically operable to govern the operations of said actuating means including means actuated upon completion of the broaching stroke to effect an indexing of said work support carrying the work to discharge position.

2. An internal broaching machine comprising, in combination, broach actuating mechanism including a slide having a broaching tool holder at one end thereof for releasably holding a broaching tool, and means for actuating the slide through a broaching stroke and a return stroke, a movably mounted device for handling the broaching tool by its trailing end when detached from the broach holder, means for actuating said device, an indexable work support, means actuating said support to transport a work piece from a loading position to a broaching position and thereafter from the broaching position to a discharge position, and means automatically operable to govern the operations of said actuating means including means actuated upon completion of the indexing to discharge position to initiate return of the broaching tool to the broach handling device.

3. An internal broaching machine comprising, in combination, broach actuating mechanism including a slide having a broaching tool holder at one end thereof for releasably holding a broaching tool and means for actuating the slide through a broaching stroke and a return stroke, a movably mounted device for handling the broaching tool by its trailing end when detached from the broach holder, means for actuating said device, an indexable work support, means for actuating said support to transport a work piece from a loading position to a broaching position and thereafter from the broaching position to a discharge position, and means automatically operable to govern the operations of said actuating means including means actuated upon return of the broach handling device to normal position to initiate operation of the actuating means causing an indexing movement of said work support carrying a new work piece to broaching position.

4. An internal broaching machine comprising, in combination, broach actuating mechanism including a slide having a broaching tool holder at one end thereof for releasably holding a broaching tool, and means for actuating the slide through a broaching stroke and a return stroke, a movably mounted device for handling the broaching tool by its trailing end when detached from the broach holder, means for actuating said device, an indexable work support, means for actuating said support to transport a work piece from a loading position to a broaching position and thereafter from the broaching position to a discharge position, and means automatically operable to govern the operations of said actuating means including means actuated upon completion of the indexing movement carrying a new work piece to broaching position to initiate a new cycle of operation of the broaching machine.

5. A broaching machine comprising, in combination, broach actuating mechanism including a slide having a broaching tool holder at one end thereof for releasably holding a broching tool and means for actuating the slide through a broaching stroke and a return stroke, an indexable work support, means for actuating the work support to move work pieces from a loading position to a broaching position and thereafter to a discharge position intermediate the broaching and loading positions, means automatically operable to govern the operations of said actuating means including means actuated as an incident to return of the broach to normal position to initiate operation of said work support actuating means to index said work support to move a work piece thereon to broaching position.

6. In a broaching machine, broach actuating means including a slide having a broaching and a return stroke, an indexable work support shiftable to a loading, a broaching and a work discharge position, power means independent of said broach actuating means for indexing said work support, control means for said power means operable when tripped to initiate indexing of the work support from broaching to discharge position, and means moving in timed relation with said slide engaging and tripping said control means at the end of the broaching stroke.

7. In a broaching machine, broach actuating means including a slide having a broaching and a return stroke, an indexable work support shiftable to a loading, a working and an intermediate work discharge position, means operable to index the work support to its discharge position at the end of the broaching stroke of the slide, and means operable upon a completion of the indexing movement to initiate the return stroke of the slide.

8. A broaching machine comprising, in combination, a broach actuating ram having a broaching tool holder at one end thereof for releasably holding a broaching tool and having a broaching stroke and a return stroke, an indexable work support operable to move work pieces from a loading position to a broaching position and thereafter to a discharge position intermediate the broaching and loading positions, means including a locking pin for positively holding said work support in indexed position, means automatically operable to govern the movements of said ram and said work support including means governed by said locking pin operating to prevent power driven movement of said ram while said pin is disengaged to free said support for indexing, said last mentioned means being operable upon return of said pin to locking engagement alternately to initiate return movement of said ram and a new cycle of operation of the broaching machine.

9. A broaching machine comprising, in combination, a broach actuating ram having a broaching tool holder at one end thereof for releasably holding a broaching tool and having a broaching stroke and a return stroke, an indexable work support operable to move work pieces from a loading position to a broaching position and thereafter to a discharge position intermediate the broaching and loading positions, means including a locking pin for positively holding said work support in indexed position, means automatically operable to govern the movements of said ram and said work support including means governed by said locking pin operating to prevent power driven movement of said ram while said pin is disengaged to free said support for indexing and to initiate return movement of said ram upon return of said pin to locking engagement.

10. In a broaching machine, broach actuating means including a slide having a broaching and a return stroke, an indexable work support shiftable to a loading, a working and work discharge position, means automatically operable to index the work support to its discharge position at the end of the broaching stroke of the slide and to initiate the return stroke at the completion of the indexing, and means actuated during the return stroke of said slide to discharge the work.

11. In a broaching machine, broach actuating means including a slide having a broaching and a return stroke, an indexable work table operable to carry a work blank from loading position to broaching position and thereafter to discharge position, a tiltable work support carried by said table, means automatically operable at the end of the broaching stroke of said slide to initiate indexing of said table from broaching to work discharging position, and upon completion of the indexing movement to initiate the return stroke of said slide, tripping means having a lever disposed at the discharge position of said table and a lever disposed opposite said slide, means on said slide rocking said tripping means during the return stroke of said slide, said second lever being operable when a work support is in discharge position to engage and tilt the work support to discharge the work therefrom.

12. In a broaching machine, a work supporting table indexable to a loading position, a working position and an unloading position, a tiltable work support on the table yieldably urged to a normal work supporting position, and means cooperable with the work support when in unloading position to effect tilting thereof to discharge the work.

13. In a broaching machine, a broach actuating slide, a work supporting table indexable to a loading position, a working position and an unloading position, a tiltable work support on the table yieldably urged to a normal work supporting position, a cam mounted on said broach actuating slide, and means engaged and actuated by said cam during the return stroke of said slide to tilt said work support when in unloading position to discharge the work therefrom.

14. In a broaching machine, a broach actuating main slide having a broaching tool holder at one end thereof for releasably holding a broaching tool, and a device for handling the broaching tool by its trailing end when detached from the broach holder including a broach receiving member movable therein, detent means carried by said member for releasably holding a broaching tool and detent means mounted in said device engaging said member and yieldably retaining said member in said device for automatic release upon application of excess force by the tool.

15. In a broaching machine, a broach actuating main slide having a broaching tool holder at one end thereof for releasably holding a broaching tool, and a device for handling a broaching tool by its trailing end when detached from the broach holder including means for releasably holding a broaching tool comprising an outer body, an inner member having an axial bore adapted to receive an end of a broaching tool therein, said inner member being loosely received in said outer body for axial withdrawal, a dog pivoted in said inner member and adapted to project into the bore therein to engage means on the broaching tool, spring pressed means yieldably urging said dog inwardly, a notch on the external surface of said inner member, and a spring pressed detent in said body engaging the notch in said inner member releasably to retain the same.

16. In a machine tool, a rotary work supporting table having a plurality of radially extending grooves opening through the periphery of the table and equally spaced angularly, means for indexing the table through angular amounts less than 180° comprising a quadrant mounted for rotation on an axis parallel with the axis of said table, a motor for driving said quadrant, a follower carried by said quadrant, said quadrant having its axis spaced from the axis of said table and said follower so spaced radially thereon as to engage in a groove in said table during only a portion of a revolution of said quadrant, means for locking said table in its various positions comprising a plurality of sockets, one for each position, formed in said table and a locking plunger engageable with said sockets, and an elongated cam formed on said quadrant and operable prior to entry of the follower into a groove to engage and withdraw said locking plunger and to hold the same withdrawn until the follower again leaves the groove.

17. In a broaching machine a broach actuating slide, a work supporting table indexable to a loading, a working and a work discharge position, a tiltable work support mounted on said table yieldably urged to work supporting position, means for tilting said work support when the same is in work discharge position comprising a first rotatably mounted shaft, an arm non-rotatably fixed on said shaft, a cam carried on said broach actuating slide, means normally rocking said shaft to position the arm in the path of said cam to rock said shaft during the return stroke of said slide, a second shaft coaxial with said first shaft, a second arm non-rotatably fixed on said shaft and operable upon rotation to tilt said work support to discharge the work therefrom, a clutch interposed between said shafts, said second shaft having limited axial movement permitting engagement or disengagement of said clutch and projecting outwardly of the broaching machine for operation by an attendant, and means for holding the shaft in clutch engaged or clutch disengaged position.

18. An internal broaching machine comprising, in combination, a stationary work support, a broach actuating ram having a broaching tool holder at one end thereof and disposed to one side of the stationary work support for releasably holding a broaching tool, means for actuating the ram, a movably mounted device disposed to the other side of the work support for handling the broaching tool by its trailing end when detached from the broach holder, means for actuating said device, an indexable work support, a work loading station, a broaching station and an unloading station intermediate the broaching and the loading stations, means for driving said indexable work support from station to station, control means initiating operation of said driving means to index said work support, and means operable upon completion of the broaching stroke by said broach actuating ram to initiate operation of said driving means to index the work support to unloading position where it is out of the path of the broach during the return to the broach handling device.

19. An internal broaching machine comprising, in combination, broach actuating means including a slide having a broaching tool holder at one end thereof for releasably holding a broaching tool, a movably mounted device for handling the broaching tool by its trailing end when detached from the broach holder, an indexable work support operable to transport a work piece from a loading position to a broaching position and thereafter from the broaching position to a discharge position, driving means for each said slide, said handling device and said work support, control means for governing said driving means, and means actuated in timed relation to the movement of said slide operable upon completion of the broaching stroke to initiate operation of the driving means for said work support to carry the work to discharge position.

20. An internal broaching machine comprising, in combination, broach actuating mechanism including a slide having a broaching tool holder at one end thereof for releasably holding a broaching tool and means for actuating the slide, a movably mounted device for handling the broaching tool by its trailing end when detached from the broach holder, means for actuating said device, an indexable work support, means actuating said support to transport a work piece from a loading position to a broaching position and thereafter from the broaching position to a discharge position, control means for said actuating means including tripable devices for initiating or arresting operation of said actuating means, and means carried by said work support engaging, upon the work support reaching discharge position, a tripable device initiating operation of the actuating means effecting return of the broach actuating mechanism.

21. An internal broaching machine comprising, in combination, broach actuating mechanism including a slide having a broaching tool holder at one end thereof for releasably holding a broaching tool and means for actuating the slide, a movably mounted device for handling the broaching tool by its trailing end when detached from the broach holder, means for actuating said device, an indexable work support, means for actuating said support to transport a work piece from a loading position to a broaching position and thereafter from the broaching position to a discharge position, control means for said actuating means including tripable devices for initiating or arresting operation of the actuating means, and means actuated in timed relation with the movement of said broach handling device operable upon return of the broach handling device to normal position to engage a tripable device initiating an indexing movement of said work support to carry a new work piece to broaching position.

22. An internal broaching machine comprising, in combination, broach actuating mechanism including a slide having a broaching tool holder at one end thereof for releasably holding a broaching tool and means for actuating the slide, a movably mounted device for handling the broaching tool by its trailing end when detached from the broach holder, means for actuating said device, an indexable work support, means for actuating said support to transport a work piece from a loading position to a broaching position and thereafter from the broaching position to a discharge position, control means for said actuating means including tripable devices for initiating or arresting operation of said actuating means, and means actuated in timed relation with said work support engaging, upon completion of the indexing movement carrying a new work piece to broaching position, a tripable device initiating operation of the actuating means for said device to start a new cycle of operation of the broaching machine.

23. A broaching machine comprising, in combination, broach actuating mechanism including a slide having a broaching tool holder at one end thereof for releasably holding a broaching tool and means for actuating the slide through a broaching stroke and a return stroke, an indexable work support, means for actuating the work support to move work pieces from a loading position to a broaching position and thereafter to a discharge position intermediate the broaching and loading positions, means automatically operable to govern the operation of said actuating means including tripable devices for initiating or arresting operation of said actuating means, and means actuated in timed relation with the broach engaging, upon return of the broach to normal position, a tripable device initiating operation of the actuating means for said work support to carry a work piece thereon to broaching position.

24. In a broaching machine, a work supporting table indexable to a loading position, a working position and an unloading position, a tiltable work support on the table yieldably urged to a generally horizontal work supporting position, and means cooperable with the work support when in unloading position to effect tilting thereof from its horizontal position to discharge the work by gravity.

25. In a broaching machine, a broach actuating main slide having a broaching tool holder at one end thereof for releasably holding a broaching tool, and a device for handling the broaching tool by its trailing end when detached from the broach holder, including means for releasably holding a broaching tool comprising an outer body having a stepped bore forming an annular shoulder, an inner member received in said bore and having an annular shoulder engaging the shoulder in said bore to prevent relative movement between said outer body and said inner member in one direction, said member being adapted to receive an end of a broaching tool, means for releasably holding a tool in said inner member, and detent means for releasably holding said inner member in said outer body against relative movement in the direction not restrained by the shoulders.

JOHN W. PODESTA.